US012734759B2

(12) United States Patent
Roua

(10) Patent No.: US 12,734,759 B2
(45) Date of Patent: Sep. 15, 2026

(54) FUSED FILAMENT ADDITIVE MANUFACTURING INSTALLATION COMPRISING AN EXTRUSION NOZZLE AND A DEVICE FOR MEASURING AND THERMALLY CONTROLLING THE METHOD

(71) Applicant: Cogit Composites, Saint-Germain du Puy (FR)

(72) Inventor: Christophe Roua, Bourges (FR)

(73) Assignee: Cogit Composites, Saint-Germain du Puy (FR)

( * ) Notice: Subject to any disclaimer, the term of this patent is extended or adjusted under 35 U.S.C. 154(b) by 336 days.

(21) Appl. No.: 18/682,816

(22) PCT Filed: Jul. 25, 2022

(86) PCT No.: PCT/FR2022/051490
§ 371 (c)(1),
(2) Date: Feb. 9, 2024

(87) PCT Pub. No.: WO2023/017218
PCT Pub. Date: Feb. 16, 2023

(65) Prior Publication Data

US 2024/0278504 A1 Aug. 22, 2024

(30) Foreign Application Priority Data

Aug. 9, 2021 (FR) ...................................... 2108597

(51) Int. Cl.
*B29C 64/386* (2017.01)
*B29C 64/118* (2017.01)
(Continued)

(52) U.S. Cl.
CPC .......... *B29C 64/386* (2017.08); *B29C 64/118* (2017.08); *B29C 64/209* (2017.08); *B33Y 30/00* (2014.12); *B33Y 50/00* (2014.12)

(58) Field of Classification Search
CPC ... B29C 64/386; B29C 64/118; B29C 64/209; B29C 64/393; B33Y 30/00; B33Y 50/00; B33Y 10/00; B33Y 50/02
See application file for complete search history.

(56) References Cited

U.S. PATENT DOCUMENTS 5,303,141 A 4/1994 Batchelder et al.
2017/0297095 A1* 10/2017 Zalameda ............ B29C 64/393
2019/0168458 A1 6/2019 Puigardeu Aramendia et al.

FOREIGN PATENT DOCUMENTS

CN 107225751 A 10/2017
CN 107225754 A 10/2017
(Continued)

OTHER PUBLICATIONS

French Search Report for Application No. 2108597 dated Apr. 8, 2022, 2 pages.
(Continued)

*Primary Examiner* — John E Breene
*Assistant Examiner* — Manuel Salvador Castellon, Jr.
(74) *Attorney, Agent, or Firm* — TraskBritt

(57) ABSTRACT

A fused filament additive manufacturing installation comprises an extrusion nozzle for depositing a filament of material on a receiving surface supported by a plate that is mobile relative to the nozzle and a thermographic device. The thermographic device includes at least two thermal cameras linked to the frame of reference of the extrusion nozzle and oriented around the extrusion axis of the nozzle. The fields of view of the thermal cameras are determined so as to cover a zone surrounding the extrusion axis with an intermediate zone in which the fields of view overlap. The
(Continued)

installation further includes a means whereby, for each of the thermal cameras matrices of the historical sequences of temperature (x, y, z, $t_{pure}$)i and relative position (X, Y, Z)i or $(R, \theta, \Phi)_i$ of a point of reference of the nozzle with respect to the plate or print support are recorded.

5 Claims, 2 Drawing Sheets

(51) Int. Cl.

| | |
|---|---|
| ***B29C 64/209*** | (2017.01) |
| ***B33Y 30/00*** | (2015.01) |
| ***B33Y 50/00*** | (2015.01) |

(56) References Cited

FOREIGN PATENT DOCUMENTS

| | | | |
|---|---|---|---|
| EP | 3398751 | A1 | 11/2018 |
| WO | 2017/054842 | A1 | 4/2017 |
| WO | 2017/152142 | A1 | 9/2017 |

OTHER PUBLICATIONS

International Search Report for Application No. PCT/FR2022/051490 dated Oct. 5, 2022, 2 pages.
International Written Opinion for Application No. PCT/FR2022/051490 dated Oct. 5, 2022, 7 pages.

* cited by examiner

FUSED FILAMENT ADDITIVE MANUFACTURING INSTALLATION COMPRISING AN EXTRUSION NOZZLE AND A DEVICE FOR MEASURING AND THERMALLY CONTROLLING THE METHOD

CROSS-REFERENCE TO RELATED APPLICATIONS

This application is a national phase entry under 35 U.S.C. § 371 of International Patent Application PCT/FR2022/051490, filed Jul. 25, 2022, designating the United States of America and published as International Patent Publication WO 2023/017218 A1 on Feb. 16, 2023, which claims the benefit under Article 8 of the Patent Cooperation Treaty of French Patent Application Serial No. FR2108597, filed Aug. 9, 2021.

TECHNICAL FIELD

The present disclosure relates to the field of additive manufacturing and more particularly to the non-destructive quality control of parts produced by fused filament additive manufacturing (Fused Deposition Modeling (FDM), or Fused Filament Fabrication (FFF)) or by Directed Energy Disposition (DED) or Wire Arc Additive Manufacturing (WAAM) type techniques.

BACKGROUND

In 3D printing, machines that use an extrusion deposition process, a plastic filament (generally wound on a spool and unwound to provide material) is used and applied through an extrusion nozzle, which regulates the flow of the melt-based plastic by controlling the feed rate of the filament. The extrusion nozzle is heated to activate the material in a form suitable for the deposition. The extrusion nozzle can be moved in the horizontal and vertical directions by a computer-controlled mechanism in the case of a Cartesian printer, or polar coordinates in the case of a delta printer and robotic arm. Alternatively, the platform of the printer can be moved relative to the extrusion nozzle, or coordinated movements of the nozzle and the platform can be used to obtain the desired extrusion path in the x, y and z directions. The model or the part is produced by extruding a filament of thermoplastic material to form consecutive layers in the vertical direction (that is to say, the "z" direction). The material hardens immediately after extrusion from the extrusion nozzle. Various polymers, with or without fiber, additive or metal filler, are used in such an extrusion deposition process, including but not limited to: acrylonitrile butadiene styrene (ABS), polycarbonate (PC), polylactic acid (PLA), high density polyethylene (HDPE), PC/ABS, polyphenylsulfone (PPSU) and the polyaryletherketone (PAEK, PEEK, PEKK) family or also agglomerated metal powder in 5 to 10% polymer in the case of PIM (powder injection molding) printing.

Generally, the polymer is in the form of a filament, manufactured from virgin resins or with filler of fiber, additive or metal.

Quality control remains problematic because numerous parameters influence the homogeneity of the deposition of the thermoplastic material, in particular, the temperature of the extruded material, the temperature of the deposition zone, the rate of deposition and extrusion, the configuration of the part, etc. Quality control means:

- controlling the quality of parts throughout the manufacturing process; and
- optimizing the effects of the parameters of the process and signatures of the manufacturing method on the quality of the parts.

The solution for maintaining quality control typically involves collecting samples of parts for destructive testing, in order to verify the presence of flaws or porosity, delamination, or any other defect that reveals a poorly controlled additive manufacturing process.

The disclosure also applies to Directed Energy Disposition (DED) type additive manufacturing, or Wire Arc Additive Manufacturing (WAAM).

In the prior art, patent application WO2017054842 describes an additive manufacturing system comprising a control device configured for:

- obtaining temperature information from one or more temperature sensors, each of the one or more temperature sensors being configured to measure the temperature of a respective pixel zone in a plurality of pixel zones in a print bed zone intended for at least one layer of a part being printed in a given three-dimensional printing process;
- obtaining agent concentration information, the received agent concentration information comprising, for each pixel zone in the plurality of pixel zones, a concentration of each of a plurality of printing agents present in the respective pixel zone;
- based on the temperature information and the obtained agent concentration information, for each pixel zone in the plurality of pixel zones, determining the temperature of each printing agent in the plurality of printing agents that is present in the respective pixel zone; and based on the temperatures defined for each pixel zone and each printing agent, determine a power to be applied to a heating subsystem used in the given three-dimensional printing process.

Patent EP3398751 describes a system comprising a first container for receiving a thermosetting resin, a second container for receiving a hardening control additive and a third container for receiving a filler material. The system further comprises a mixer connected to the first container, the second container and the third container. The mixer is used to mix the resin, the additive and the filler material.

American patent CN107225751 proposes high-speed molding equipment, and the preparation method for providing a kind of conductive foam, aims to solve the problem due to low production efficiency when human support produces the conductive foam.

U.S. Pat. No. 5,303,141 describes a closed-loop extrusion system that comprises a nozzle for extruding a material, such as a hot-melt adhesive; an apparatus for controllably positioning the nozzle in accordance with the specification; and a sensor for generating a feedback signal, which is indicative of at least one characteristic of a most recently extruded part of the material.

Patent US2019168458 describes a three-dimensional (3D) printer comprising a dispensing device for selectively dispensing liquid droplets onto a layer of construction materials and a controller for determining a preselected area on the layer of construction materials at which the dispensing device is to deliver liquid droplets, in order to determine a distribution for which spaces are to be formed when dispensing the droplets of liquid into the preselected area.

The solutions of the prior art have different drawbacks.

Firstly, the thermography of the part requires high resolution sensors, and heavy digital processing operations to extract the relevant information.

Secondly, the configuration of the part and the nozzle partially masks the thermographic measurement field, which distorts the measurements.

Finally, the non-destructive control is carried out a posteriori by through-radiation devices (X-ray, tomography, for example), which requires heavy digital processing to provide information regarding the presence of defects, and moreover does not provide information about the quality of the interlayer interfaces or on the physicochemical state of the material deposited (crystallinity, etc.).

BRIEF SUMMARY

In order to address the drawbacks of the prior art, the disclosure relates, in its most general sense, to a fused filament additive manufacturing installation including an extrusion nozzle for depositing a filament of material on a receiving surface supported by a plate that is mobile relative to the extrusion nozzle as well as a thermographic device. The thermographic device includes at least two thermal cameras linked to a frame of reference of the extrusion nozzle and oriented around an extrusion axis of the extrusion nozzle. A field of view of the thermal cameras is determined so as to cover a zone surrounding the extrusion axis with an intermediate zone in which the fields of view overlap. The installation further includes a means whereby, for each of the at least two thermal cameras, matrices of the historical sequences of temperature $(x, y, z, t_{pure})_i$ and relative position $(X, Y, Z)_i$ or $(R, \Theta, \Phi)_i$ of a point of reference of the extrusion nozzle with respect to the plate or print support are recorded.

Preferably, the fields of view of the thermal cameras are between 5 and 5000 times the median cross-section of the extrusion filament.

Advantageously, the installation further comprises a means for measuring the temperature of the nozzle and the nozzle is partially arranged in the field of view of at least one of the thermal cameras.

The disclosure also relates to a method for characterizing a part produced by fused filament additive manufacturing. The method comprises a step of acquisition by at least two thermal cameras linked to the frame of reference of the extrusion nozzle and oriented around the extrusion axis of the nozzle, the field of view of the thermal cameras being determined so as to cover a zone surrounding the extrusion axis with an intermediate zone in which the fields of view overlap, matrices of the historical sequences of temperature $(x, y, z, t_{pure})_i$ as well as the relative position $(X, Y, Z)_i$ or $(R, \Theta, \Phi)_i$ of a point of reference of the nozzle with respect to the plate or print support are recorded, as well as processing to determine a digital twin of the part, consisting in calculating a matrix $(X, Y, Z, t_{pure}, t)_i$ or $(R, \Theta, \Phi, t_{pure}, t)_i$ of the localized evolution of the temperature. According to one variant, the method comprises a step of acquisition by at least two of thermal cameras linked to the frame of reference of the extrusion nozzle and oriented around the extrusion axis of the nozzle, the field of view of the thermal cameras being determined so as to cover a zone surrounding the extrusion axis with an intermediate zone in which the fields of view overlap, matrices of the historical sequences of temperature $(x, y, z, t_{pure})$i as well as relative position $(X, Y, Z)_i$ or $(R, \Theta, \Phi)_i$ of a point of reference of the nozzle with respect to the plate or print support are recorded, as well as processing for determining a spatiotemporal drift of the temperature with respect to a digital reference model.

BRIEF DESCRIPTION OF THE DRAWINGS

The present disclosure will be better understood upon reading the following description, which relates to a non-limiting exemplary embodiment that is illustrated by the appended drawings, in which.

DETAILED DESCRIPTION

General Principles

Figure 1:
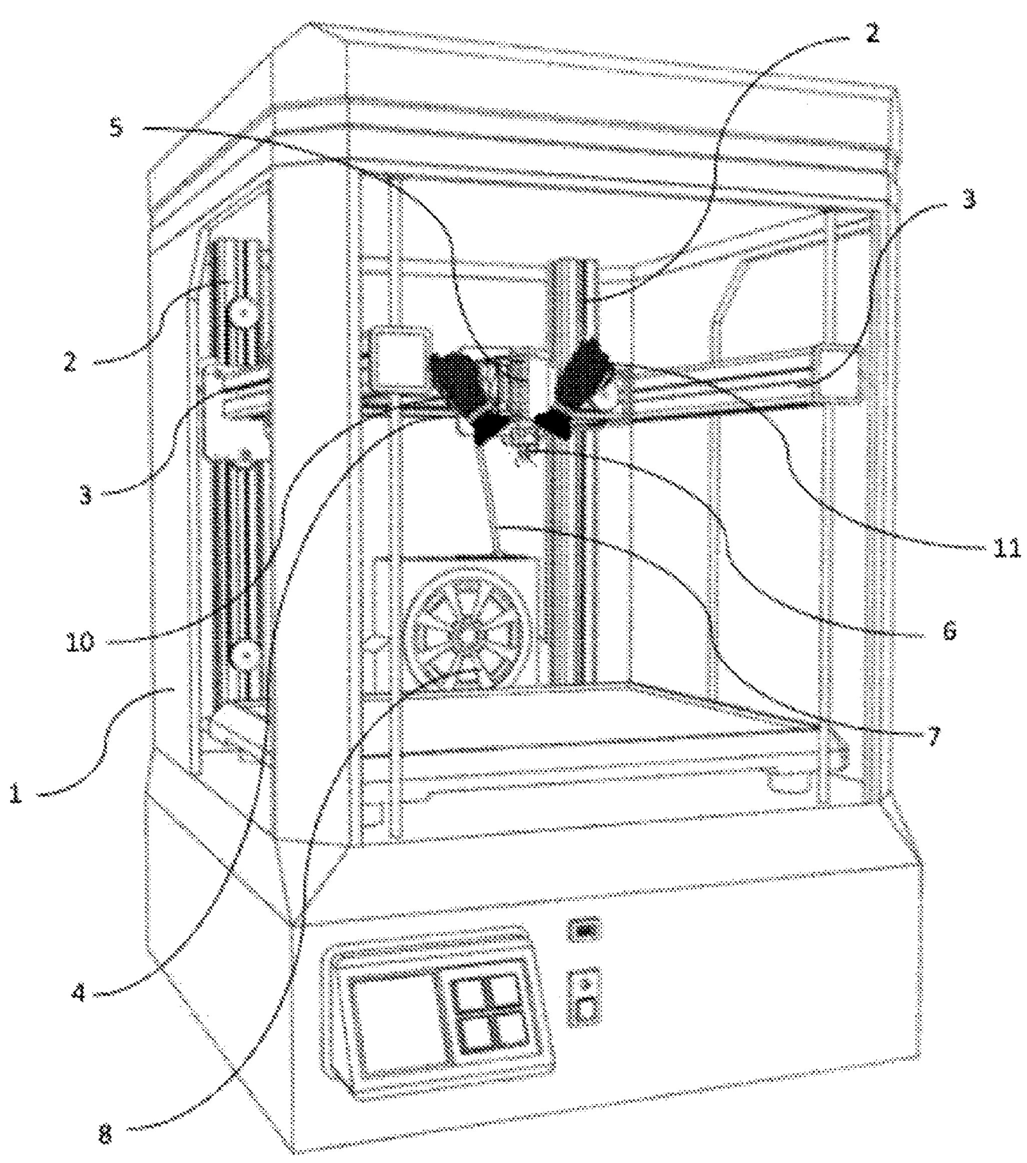
FIG. 1 shows a schematic view of additive manufacturing equipment according to the disclosure.

FIG. 1 shows a schematic view of filament additive manufacturing equipment according to the disclosure. The installation is made up in a known manner by an enclosure (1) surrounding a motorized frame formed by vertical columns (2) ensuring the guidance and movement along a vertical axis Z of a mobile frame formed by cross-members (3) oriented from front to rear along the axis Y and transverse cross-members (4) oriented laterally along the axis X. This mobile frame supports an extrusion head (5) extended by a nozzle (6). The extrusion head (5) is fed by a filament (7) from a spool (8).

The extrusion head (5) ensures the driving of the filament (7) with an adjustable and controllable speed, as well as its heating.

The movements of the extrusion head expressed in an overall Cartesian X, Y, Z or global spherical coordinate system $(R, \Theta, \Phi)$ are controlled by a CAD/CAM program (computer-aided design and manufacturing). When the printing process is launched by the user, the software determines by calculations and spatial visualizations how and when each layer of material will be deposited. It extracts from the 3D digital model a multitude of layers (Cartesian cases) or deposition height iso-surface 3D that the machine will print successively, stratum by stratum, the interlayer cohesion of which is decisive for the integrity of the part.

Once the printing path has been defined, a motor rotates the spool (8) to convey the filament (7) of material into the heating zone of the extrusion head (5) whose temperature exceeds the melting temperature of the material to be converted, thus melting the filament (7). The molten material is deposited in the form of a fine filament on a support plate. The enclosure and the plate can be heated to ensure a temperature inside the printing environment allowing the part being formed to be brought to temperature, and to reduce the temperature differences between the molten material delivered by the nozzle (6) and the deposition surface.

The nozzle (6) deposits the material in the X-Y or height-of-deposition iso-surface. Once the layer has been completely deposited, the nozzle rises to the next layer and resumes the process. Depending on the printer model, it is the nozzle or the support plate that moves, which does not affect the final result. Each layer of material solidifies on the preceding one, from bottom to top. Thus, the different layers of material that are superimposed form a 3D printed object and, depending upon the quality of the printer and the filament, the object may be formed with more or less precision.

Thermal Control

The installation further comprises at least two thermal cameras (10, 11) that capture the infrared radiation emitted by the zone being processed in order to provide a matrix image of N×M pixels, typically 320×240 pixels or with a high resolution, with a refresh rate of 60 Hertz, for example.

Figure 2:
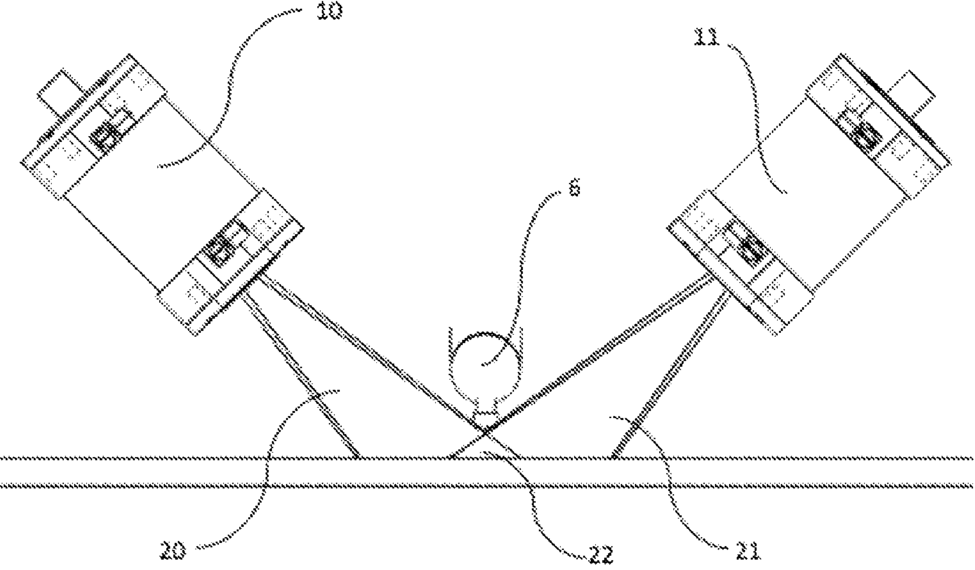
FIG. 2 shows a schematic view of means of thermal control of the additive manufacturing equipment according to the disclosure.

Referring to FIG. 2, the thermal cameras (10, 11) are arranged around the extrusion axis, for example, symmetrically on either side of a median plane. They are oriented so that their fields of vision (20, 21) intersect at the vertical of the nozzle (6), a few millimeters below, so that the measurement fields (20, 21) slightly overlap (22), and cover the deposition zone and the surrounding surface over a dimension corresponding to the surface area where local heat exchange occurs during the deposition of the extruded material, typically a deposition surface area of between about 5×7 mm, and a surrounding surface area of between about 50×70 millimeters (combined thermal fields of view of the cameras), regardless of the size of the part to be manufactured.

These values do not vary with the size of the part but with the size of the deposited filament. A surrounding surface is required to have enough information about cooling as well as a number of pixels/$\mu m^2$ high enough to read the temperature of a filament.

The thermal measurement fields can contain a part of the body of the nozzle (6) or of the extrusion head (5), in order to have a constant reference, the temperature of the nozzle (6) or of the extrusion head (5) being known by a single-element temperature sensor (pyrometer or thermocouple, for example) whose data are also used to control the heating of the extrusion head (5). Optionally, a continuous calibration is carried out using a body with known emissivity.

The data are recorded periodically in a memory, in the form of a time-stamped digital file comprising, for each of the recordings, the temperature matrix (Tpure x, Tpure y, Tpure z) or (Tpure R, Tpure theta, Tpur Phi) and time information or an order number making it possible to have a spatiotemporal sequence of the variations in the temperatures in the vicinity of the nozzle (6).

With the same temporal frame of reference, the installation also records the positions (X, Y, Z) or (R, Θ, Φ) of the nozzle (6) and/or associates the pre-programmed position of the path, via the position sensors of the measurable movement axes in real time. Or, the trajectories can be used as a function of the time defined by the G-CODE (file generating by the FAO).

With the same temporal frame of reference, the positions (X, Y, Z) or (R, Θ, Φ) of the nozzle (6) are also recorded by the installation and/or associated with the position generated by the CAD/CAM path program.

These recordings make it possible to reconstruct the spatiotemporal evolution of the variations in the temperatures of the part manufactured by the installation by defining a digital twin of the manufactured part, which makes it possible to identify the origin of a defect, in the event of subsequent failure.

The recordings also make it possible to control the operation of the installation in real time by processing the recorded data in order to determine possible drifts relative to thresholds, predefined analytical or digital models representing the behavior of the printed material in order to predict the quality of the material (crystalline state, porosity, mechanical strength, interlayer interface quality, etc.).

The control of the installation may comprise a local energy supply (laser/IR lamp, for example) in order to adjust the temperature of the material before or during deposition in the vicinity of the nozzle (6), or else the printing parameters (displacement, speed, temperature, in the case of drift, a local energy supply (laser/IR lamp, etc) can be used, this energy supply being controlled by the control system.

The digital twin identifies zones containing potential defects from thermal data in order to monitor the parts on a posteriori basis by external devices (CND, tomography, etc.). The correlation between the digital twin and the quality post-controls makes it possible to improve the pre-defined models iteratively just like machine learning.

The invention claimed is:

1. A fused filament additive manufacturing installation comprising an extrusion nozzle for depositing a fused filament of material on a receiving surface supported by a plate that is mobile relative to the extrusion nozzle, and a thermographic device, the thermographic device including at least two thermal cameras linked to a frame of reference of the extrusion nozzle and oriented around an extrusion axis of the extrusion nozzle, a field of view of each of the at least two thermal cameras being determined so as to cover a zone surrounding the extrusion axis with an intermediate zone in which the fields of view overlap, the installation further comprising a means whereby, for each of the at least two thermal cameras, matrices of historical sequences of temperature $(x, y, z, t_{pure})_i$ and a relative position $(X, Y, Z)_i$ or $(R, \Theta, \Phi)_i$ of a point of reference of the extrusion nozzle with respect to the plate or the receiving surface are recorded.

2. The fused filament additive manufacturing installation of claim 1, wherein the field of view of each of the at least two thermal cameras is between 5 and 5000 times a median cross-section of the fused filament.

3. The fused filament additive manufacturing installation of claim 1, further comprises a means for measuring the historical sequences of temperature of the extrusion nozzle and in that the extrusion nozzle is arranged partially in the field of view of at least one of the at least two thermal cameras.

4. A method for characterizing a part produced by fused filament additive manufacturing, the method comprising a step of acquisition by at least two thermal cameras linked to a frame of reference of an extrusion nozzle and oriented around an extrusion axis of the extrusion nozzle, a field of view of each of the at least two thermal cameras being determined so as to cover a zone surrounding the extrusion axis with an intermediate zone in which the fields of view overlap, matrices of historical sequences of temperature $(x, y, z, t_{pure})_i$ and relative position $(X, Y, Z)_i$ or $(R, \Theta, \Phi)_i$ of a point of reference of the extrusion nozzle with respect to a plate or to a receiving surface are recorded, and processing to determine a digital twin of the part, consisting in calculating a matrix $(X, Y, Z, t_{pure}, t)_i$ or $(R, \Theta, \Phi, t_{pure}, t)_i$ of localized evolution of a temperature.

5. A method for characterizing a part produced by fused filament additive manufacturing, comprising acquisition by at least two thermal cameras linked to a frame of reference of an extrusion nozzle and oriented around an extrusion axis of the extrusion nozzle, a field of view of each of the at least two thermal cameras being determined in order to cover a zone surrounding the extrusion axis with an intermediate zone in which the fields of view overlap, matrices of historical sequences of temperature $(x, y, z, t_{pure})_i$ and relative position $(X, Y, Z)_i$ or $(R, \Theta, \Phi)_i$ of a point of reference of the extrusion nozzle relative to a plate or to a receiving surface are recorded, and processing for determining a spatiotemporal drift of a temperature with respect to a digital reference model.

* * * * *